United States Patent [19]

Obara

[11] 4,347,425
[45] Aug. 31, 1982

[54] WIRE-CUT, ELECTRIC-DISCHARGE MACHINING POWER SOURCE

[75] Inventor: Haruki Obara, Sagamihara, Japan

[73] Assignee: Fujitsu Fanuc Limited, Tokyo, Japan

[21] Appl. No.: 191,448

[22] Filed: Sep. 29, 1980

[30] Foreign Application Priority Data

Oct. 5, 1979 [JP] Japan .................................. 54-128702

[51] Int. Cl.³ ................................................ B23P 1/02
[52] U.S. Cl. .................................. 219/69 C; 219/69 P
[58] Field of Search ............................ 219/69 C, 69 P

[56] References Cited

U.S. PATENT DOCUMENTS

| 2,951,930 | 9/1960 | McKechnie | 219/69 C |
| 3,509,305 | 4/1970 | Bertolasi | 219/69 P |
| 3,757,073 | 9/1973 | van Osenbruggen et al. | 219/69 C |
| 4,211,908 | 7/1980 | Niwa | 219/69 P |

FOREIGN PATENT DOCUMENTS 50-123053  9/1975  Japan ................................. 219/69 P Primary Examiner—C. C. Shaw
Attorney, Agent, or Firm—Staas & Halsey

[57] ABSTRACT

A wire-cut, electric-discharge machining power source which is provided with a first low-current discharge circuit and a second high-current discharge circuit. The first low-current discharge circuit makes a wire electrode positive and a workpiece negative, and the second high-current discharge circuit makes the wire electrode negative and the work positive. After triggering a discharge by the first low-current discharge circuit, a main discharge for machining is produced by the second high-current discharge circuit.

4 Claims, 2 Drawing Figures

WIRE-CUT, ELECTRIC-DISCHARGE MACHINING POWER SOURCE

BACKGROUND OF THE INVENTION

1. Field of the Invention

The present invention relates to a wire-cut, electric-discharge machining power source, and more particularly to a wire-cut, electric-discharge machining power source which is capable of suppressing electrolytic action on a workpiece and which permits high-speed machining.

2. Description of the Prior Art

A wire-cut, electric-discharge machine has various advantages such as requiring no special operator skills for working a metal mold or the like of a complicated configuration with a high degree of accuracy and, since the electrode for the electric-discharge machining is a wire, there is no need to manufacture a working electrode having required configuration for a metal mold as is needed in ordinary electric-discharge machines. On account of such advantages, the wire-cut, electric-discharge machine is has very wide application, but there is a drawback to because machine that the cutting speed is low. In order to increase the cutting speed, the machine has undergone various improvements. Also the present inventor has previously proposed, as the wire-cut, electric-discharge machining power source, a power source of the type in which a voltage is applied from a low-voltage, low-current power source to a machining gap defined between the wire and a workpiece to trigger a discharge and then a pulse current of large current value and small pulse width is applied from a high-voltage, high-current power source to the aforesaid gap, thereby to increase the cutting speed.

With the aforesaid power source previously proposed by the present inventor, both the low-voltage and the high-voltage power source employ the workpiece as the anode and the wire as the cathode, as is the case with the prior art. Accordingly, in the case of a wire-cut, electric-discharge machine of the type employing water as a working liquid and producing a discharge in the water, the workpiece is hot-worked by the discharge and, at the same time, subjected to electrochemical machining by the electrolytic action. The electrolytic action generates hydrogen bubbles in the machining gap and discharge of the bubbles may break the wire; furthermore, the flatness of the worked surface is reduced by non-uniform conductivity distribution of the working liquid over the entire area of the work surface and the workpiece readily gets rusty. In the case where the workpiece is made of a hard metal containing cobalt as a binder, the cobalt is corroded, presenting a problem of material defects. Accordingly, it is desirable to minimize the electrolytic action on the workpiece.

It is not preferred, however, to use the workpiece as the cathode and the wire as the anode contrary to the arrangement usually employed, with the view of removing the electrolytic action. The reason is that such reverse-polarity discharge generally makes the discharge unstable (markedly decreasing the cutting speed) and greatly wears the wire (often breaking it).

SUMMARY OF THE INVENTION

It is an object of the present invention to provide a power source suitable for use with a wire-cut, electric-discharge machine.

Another object of the present invention is to provide a wire-cut, electric-discharge machining power source which is adapted to minimize the electrolytic action on a workpiece without introducing any difficulties.

Yet another object of the present invention is to provide a wire-cut, electric-discharge machining power source which is capable of increasing the cutting speed.

Briefly stated, the wire-cut, electric-discharge machining power source of the present invention is provided with a first low-current discharge circuit and a second high-current discharge circuits. The first low-current discharge circuit is connected making the wire positive with respect to the workpiece, and the second high-current discharge circuit is connected making the wire negative relative to the workpiece. After a triggering discharge by the first low-current discharge circuit, a main discharge for working is produced by the second high-current discharge circuit. The reverse-polarity discharge by the first low-current discharge circuit reduces the electrolytic action on the work to lessen the influence of the electrolytic action and extinguishes ions produced by the main discharge.

DESCRIPTION OF THE PREFERRED EMBODIMENTS

Figure 1:
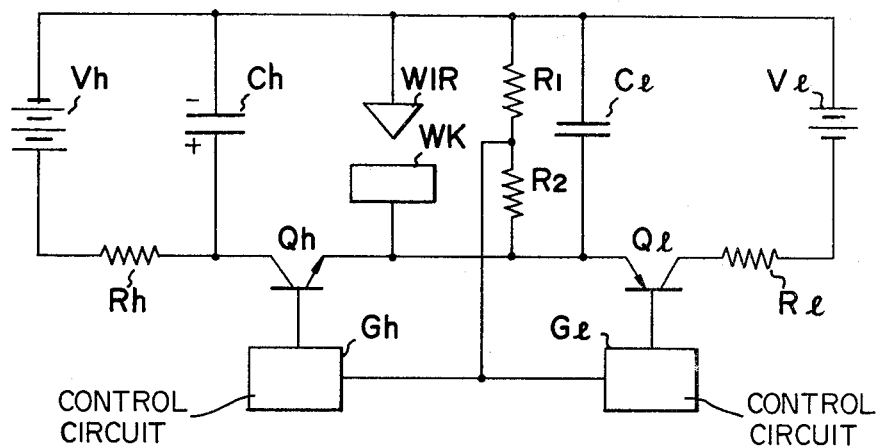
FIG. 1 is an electric circuit diagram illustrating the principal part of an embodiment of the present invention.

In FIG. 1, reference character $V_h$ indicates a second high-current source; $V_l$ designates a first low-current source; $C_h$ identifies a capacitor of a large capacitance; $C_l$ denotes a capacitor of a small capacitance; $Q_h$ and $Q_l$ represent transistors for current control use; $G_h$ and $G_l$ show control circuits; $R_h$ and $R_l$ refer to charging resistors; $R_1$ and $R_2$ indicate voltage-dividing resistors; WIR designates a wire; and WK identifies a workpiece.

The wire-cut, electric-discharge machining power source of the present embodiment includes a second high-current discharge circuit comprised of the second high-current source $V_h$, the large-capacitance capacitor $C_h$, the charging resistor $R_h$, the transistor $Q_h$ and the control circuit $G_h$ for controlling the conduction of the transistor $Q_h$, and a fist low-current discharge circuit comprised of the first low-current source $V_l$, the small-capacitance capacitor $C_l$, the charging resistor $R_l$, the transistor $Q_l$ and the control circuit $G_l$ for controlling the conduction of the transistor $Q_l$. The second high-current discharge circuit is arranged such that the workpiece WK is positive and the wire WIR is negative, as is the case with the ordinary machining power source. Conversely, the first low-current discharge circuit is arranged such that the workpiece WK is negative and the wire WIR is positive. In general, the lower the first power source voltage is and the higher the second power source voltage is, the greater the cutting speed; accordingly, it is desirable that the first power source voltage be equal to or lower than the second power source voltage, but this relationship may also be reversed according to the thickness of the workpiece and the purpose of working. Since the discharge current of the first low-current discharge circuit serves only to trigger a discharge, this discharge current is set to a very small value as compared with a discharge current of the second high-current discharge circuit. Now, a description will be made of the operation of this embodiment.

Figure 2:
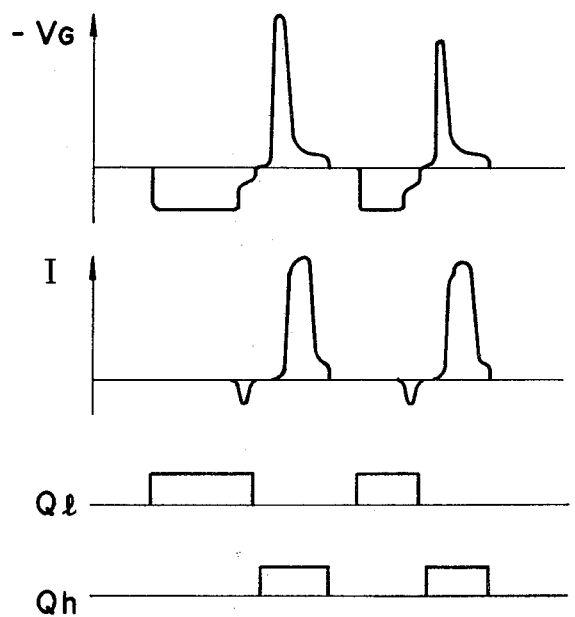
FIG. 2 shows a gap voltage $V_G$, a gap current I and the conduction timing of transistors $Q_h$ and $Q_l$ in the embodiment of FIG. 1.

When transistor $Q_l$ is turned ON by the control circuit $G_l$ at the timing shown in FIG. 2, the small-capacitance capacitor $C_l$, which is charged by the first low-current source $V_l$, provides a voltage making the wire WIR positive and the workpiece WK negative, thereby starting a discharge between them. When the discharge has thus been started, the gap voltage $V_G$ drops, so that it is voltage-divided by the resistors $R_1$ and $R_2$ and then compared as by a comparator with a reference voltage to detect the start of the discharge, and the transistor $Q_l$ is turned OFF by the control circuit $G_l$ and the transistor $Q_h$ of the second high-current discharge circuit is turned ON by the control circuit $Q_h$.

As a consequence, charges stored in the capacitor $C_h$ with the polarity indicated by $+$, $-$ in FIG. 1 are applied via the transistor $Q_h$ to the gap between the workpiece WK and the wire WIR with the former made positive and the latter negative, starting a main discharge to cut the work WK. In this case, by detecting the gap voltage $V_G$ in the same manner as described above, the end of main discharge is detected and the transistor $Q_h$ is turned OFF by the control circuit $G_h$. Then, after the elapse of a certain period of time, the transistor $Q_l$ is turned ON again and the aforesaid discharge is repeated.

In the present embodiment, the reson for which the discharge is produced using the charges stored in the capacitor $C_h$ of large capacitance is that the discharge current has a large peak value of 100 to 200 A and a small pulse width of 1 to 2 $\mu$s. By using such a capacitor $C_h$ and turning the transistor $Q_h$ OFF at the end of the discharge, it is possible to reduce the surge which is applied to the transistor $Q_h$ when it is turned OFF. The illustrated embodiment employs the capacitor $C_l$ in the first low-current discharge circuit, but its capacitance value is very small as compared with that of the capacitor $C_h$ and the capacitor $C_l$ can be omitted in some cases. The transistor $Q_l$ is shown to be a PNP transistor; this is intended to make the ground potentials of the control circuits $G_l$ and $G_h$ equal to each other. If the control circuits $G_l$ and $G_h$ are grounded separately by a high-speed photo coupler, an NPN transistor can also be used as the transistor $Q_l$.

As has been described in the foregoing, according to the present invention, in the wire-cut, electric-discharge machining power source of the type triggering a discharge by a first low-current discharge circuit and then producing a main discharge by a second high-current discharge circuit for working, the first low-current discharge circuit is connected making the wire positive and the workpiece negative. The electrolytic action on the workpiece is reduced and the application of a reverse voltage after the main discharge heightens the ion eliminating effect, so that the frequency of discharge can be increased, thus permitting high-speed machining. Since the discharge current by the first low-current source is very weak, the reverse-polarity discharge scarcely produces ill effects such as wear of the wire and so forth.

It will be apparent that many modifications and variations may be effected without departing from the scope of the novel concepts of this invention.

What is claimed is:

1. An electric-discharge machining power source for using an electrode to machine a workpiece comprising: a first low-current discharge circuit means for making the electrode positive and the workpiece negative to produce a reverse discharge; means for detecting the potential between the electrode and the workpiece to determine when the reverse discharge occurs; and a second high-current discharge circuit means, responsive to the means for detecting the potential, for making the electrode negative and the workpiece positive to produce a main machining discharge upon detection of the reverse discharge.

2. An electric-discharge machining power source according to claim 1, wherein the second high-current discharge circuit means comprises a large-capacitance capacitor connected in series with the electrode and the workpiece, a second high-current source for charging the large-capacitance capacitor, a second transistor inserted in the discharge path of the large-capacitance capacitor, and a second control circuit connected to the means for detecting the potential for switching the second transistor to produce the main machining discharge.

3. An electric-discharge machining power source according to claim 1 or 2, wherein the first low-current discharge circuit means comprises a small capacitance capacitor connected in series with the electrode and the workpiece, a first low-current source for charging the small-capacitance capacitor, a first transistor inserted in the discharge path of the small-capacitance capacitor, and a first control circuit connected to the means for detecting the potential for switching the transistor to control the reverse discharge.

4. An electric-discharge machining power source according to claim 1 or 2, wherein the first low-current discharge circuit means comprises a first low-current source, a first transistor for applying the output from the first low-current source to the electrode and the workpiece, and a first control circuit connected to the means for detecting the potential for switching the transistor.

* * * * *

UNITED STATES PATENT AND TRADEMARK OFFICE
CERTIFICATE OF CORRECTION

PATENT NO. : 4,347,425
DATED : August 31, 1982
INVENTOR(S) : Obara

It is certified that error appears in the above-identified patent and that said Letters Patent is hereby corrected as shown below:

Front page, [57] ABSTRACT, line 7, "work" should be --workpiece--.

Col. 1, line 15, after "advantages" insert --,--;

Col. 1, line 20, after "having" insert --the--;

Col. 1, line 23, delete "is";

Col. 1, line 24, "because" should be --this--; "that" should be --because--;

Col. 1, line 51, "work" should be --workpiece--.

Col. 2, line 11, "circuits" should be --circuit--;

Col. 2, line 20, "work" should be --workpiece--.

Col. 3, line 23, "work" should be --workpiece--;

Col. 3, line 30, "reson" should be --reason--.

Signed and Sealed this

Twenty-second Day of March 1983

[SEAL]

Attest:

GERALD J. MOSSINGHOFF

Attesting Officer  Commissioner of Patents and Trademarks